(12) United States Patent
Khatiwada et al.

(10) Patent No.: US 10,851,611 B2
(45) Date of Patent: Dec. 1, 2020

(54) HYBRID DISINTEGRABLE ARTICLES

(71) Applicant: Baker Hughes Incorporated, Houston, TX (US)

(72) Inventors: Suman Khatiwada, Houston, TX (US); John C. Welch, Spring, TX (US); Anil K. Sadana, Houston, TX (US); Sayantan Roy, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 283 days.

(21) Appl. No.: 15/467,424

(22) Filed: Mar. 23, 2017

(65) Prior Publication Data

US 2017/0291222 A1    Oct. 12, 2017

Related U.S. Application Data

(60) Provisional application No. 62/319,994, filed on Apr. 8, 2016.

(51) Int. Cl.
| | |
|---|---|
| *E21B 33/12* | (2006.01) |
| *B22F 3/26* | (2006.01) |
| *B22F 3/105* | (2006.01) |
| *B33Y 10/00* | (2015.01) |
| *B33Y 80/00* | (2015.01) |
| *B33Y 70/00* | (2020.01) |
| *E21B 29/02* | (2006.01) |
| *C22C 32/00* | (2006.01) |
| *B22F 3/24* | (2006.01) |
| *B22F 1/02* | (2006.01) |
| *B22F 1/00* | (2006.01) |

(52) U.S. Cl.
CPC ............ *E21B 33/12* (2013.01); *B22F 3/1055* (2013.01); *B22F 3/26* (2013.01); *B33Y 10/00* (2014.12); *B33Y 70/00* (2014.12); *B33Y 80/00* (2014.12); *C22C 32/0094* (2013.01); *E21B 29/02* (2013.01); *B22F 1/0055* (2013.01); *B22F 1/025* (2013.01); *B22F 2003/1058* (2013.01); *B22F 2003/247* (2013.01); *B22F 2999/00* (2013.01); *Y02P 10/25* (2015.11)

(58) Field of Classification Search
CPC ...................................................... E21B 33/12
See application file for complete search history.

(56) References Cited

U.S. PATENT DOCUMENTS

| | | | |
|---|---|---|---|
| 4,225,481 A * | 9/1980 | Wagner .................. | C08G 12/00 524/765 |
| 6,245,841 B1 | 6/2001 | Yeager et al. | |

(Continued)

FOREIGN PATENT DOCUMENTS

| | | |
|---|---|---|
| EP | 0396383 A2 | 11/1990 |
| WO | 2014169847 A1 | 10/2014 |

OTHER PUBLICATIONS

"Dissolvable Metal-Polymer Composite Parts", Disclosed Anonymously, IP.com, Apr. 10, 2015; 1 page.

*Primary Examiner* — Megan McCulley
(74) *Attorney, Agent, or Firm* — Cantor Colburn LLP

(57) ABSTRACT

A hybrid article comprises a disintegrable metal comprising one or more of the following: Mg; Al; Zn; Mn; an alloy thereof; or a composite thereof; and a disintegrable polymer comprising one or more of the following: an epoxy polymer derived from an epoxy base and a curing agent having cleavable bonds; a cured cyanate ester; or a poly(hexahydrotriazine).

31 Claims, 4 Drawing Sheets

(56) References Cited

U.S. PATENT DOCUMENTS

| | | | |
|---|---|---|---|
| 9,033,060 B2 | 5/2015 | Xu et al. | |
| 9,079,246 B2 | 7/2015 | Xu et al. | |
| 9,090,956 B2 | 7/2015 | Xu | |
| 9,101,978 B2 | 8/2015 | Xu et al. | |
| 10,280,359 B2* | 5/2019 | Sadana | C09K 8/508 |
| 2002/0016396 A1* | 2/2002 | Wong | C08K 3/24 |
| | | | 524/394 |
| 2002/0048691 A1* | 4/2002 | Davis | B29C 43/021 |
| | | | 428/820 |
| 2003/0072917 A1* | 4/2003 | Campbell | B29C 39/10 |
| | | | 428/141 |
| 2003/0155656 A1* | 8/2003 | Chiu | H01L 23/49827 |
| | | | 257/774 |
| 2009/0236091 A1* | 9/2009 | Hammami | E21B 17/00 |
| | | | 166/242.1 |
| 2011/0033695 A1* | 2/2011 | Kim | B82Y 30/00 |
| | | | 428/332 |
| 2011/0135530 A1* | 6/2011 | Xu | B22F 1/025 |
| | | | 419/13 |
| 2013/0245204 A1 | 9/2013 | Pastine et al. | |
| 2014/0027128 A1* | 1/2014 | Johnson | E21B 29/02 |
| | | | 166/376 |
| 2014/0221510 A1* | 8/2014 | Liang | C08J 11/26 |
| | | | 521/40 |
| 2016/0052871 A1* | 2/2016 | Qin | C07C 217/84 |
| | | | 523/468 |
| 2016/0369083 A1* | 12/2016 | Khatiwada | C08K 3/40 |
| 2019/0017346 A1* | 1/2019 | Kobayashi | B21C 23/002 |

* cited by examiner

HYBRID DISINTEGRABLE ARTICLES

CROSS-REFERENCE TO RELATED APPLICATIONS

The present application claims priority from U.S. Provisional Patent Application No. 62/319,994, filed Apr. 8, 2016. The contents of the priority application are hereby incorporated by reference in their entirety.

BACKGROUND

Downhole constructions including oil and natural gas wells, $CO_2$ sequestration boreholes, etc. often utilize borehole components or tools that, due to their function, are only required to have limited service lives that are considerably less than the service life of the well. After a component or tool service function is complete, it must be removed or disposed of in order to recover the original size of the fluid pathway for uses such as hydrocarbon production and $CO_2$ sequestration. Disposal of components or tools can be accomplished by milling or drilling the component or by tripping the tool out of the borehole. Each of these is generally time consuming and expensive. The industry would be receptive to new materials, and methods that remove a component or tool from a borehole without such milling and drilling operations.

BRIEF DESCRIPTION

A hybrid article comprises: a disintegrable metal comprising one or more of the following: Mg; Al; Zn; Mn; an alloy thereof; or a composite thereof; and a disintegrable polymer comprising one or more of the following: an epoxy polymer derived from an epoxy base and a curing agent having cleavable bonds; a cured cyanate ester; or a poly(hexahydrotriazine).

A method of manufacturing a hybrid article comprises forming a scaffold from the disintegrable metal; and forming a structure surrounding the disintegrable metal from the disintegrable polymer via molding or casting.

A method of manufacturing a hybrid article comprises forming a scaffold from the disintegrable metal; forming a polymer part from the disintegrable polymer; and attaching or fixing the polymer part to the scaffold.

A method of manufacturing a disintegrable hybrid article comprises combining a disintegrable metal power or shavings with the disintegrable polymer to provide a hybrid composition, the disintegrable metal powder comprising one or more of the following: Mg; Al; Zn; Mn; an alloy thereof; or a composite thereof; the disintegrable metal shavings comprising a metal composite which comprises: a cellular nanomatrix comprising a metallic nanomatrix material; and a metal matrix disposed in the cellular nanomatrix, and molding the hybrid composition to form the disintegrable hybrid article.

A method of manufacturing a disintegrable hybrid article comprises forming a metal part from the disintegrable metal via an additive manufacturing method, the metal part having a plurality of pores; and disposing the disintegrable polymer in the pores of the metal part under a superatmospheric pressure or a subatmospheric pressure to form the hybrid article.

A method to disintegrate an article comprises exposing the article to a fluid comprising one or more of the following: water; brine; an acid; a base; or an acidified ethylene glycol.

A method of using an article comprises: forming the article, the article comprising a first portion that is degradable in a fluid at a first degradation rate and a second portion that is degradable in the fluid at a second degradation rate, wherein the first degradation rate is greater than the second degradation rate; using the article to perform a first operation; exposing the article to the fluid; selectively degrading the first portion of the article to provide a degraded article; and using the degraded article to perform a second operation that is different from the first operation, wherein the first portion comprises a disintegrable metal and the second portion comprises disintegrable polymer or the first portion comprises a disintegrable polymer and the second portion comprises a disintegrable metal.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
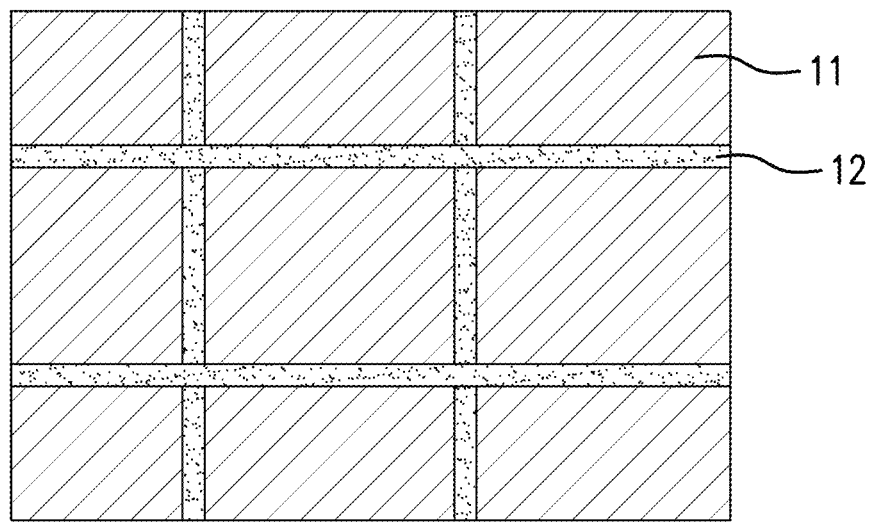
FIG. 1 illustrates a hybrid article comprising a scaffold and a surrounding structure, where the scaffold comprises a disintegrable metal and the surrounding structure comprises a disintegrable polymer.

Disclosed herein are hybrid articles that may be used in a wide variety of applications and application environments, including use in various wellbore environments as selectively and controllably disposable or disintegrable downhole tools or other downhole components.

The hybrid articles include a disintegrable polymer and a disintegrable metal. They provide a unique and advantageous combination of high tensile strength, high collapse pressure, and rapid and controlled dissolution in various wellbore fluids such as water, brine, acid, acidified ethylene glycol, or an alkaline solution at elevated temperatures. Advantageously, the disintegrable metal adds strength to the disintegrable polymer that can counter the problems that are common to polymers at elevated temperatures, such as sag or creep.

Further, the hybrid articles are able to degrade their mechanical strength and eventually break up without any additional mechanical or hydraulic forces. For example, when contacted with wellbore fluids at elevated temperatures, the degradation rate of the hybrid articles can be controlled in such a way that the articles can maintain their geometry with acceptable but degrading mechanical properties until they are no longer needed, at which time, the articles can completely disintegrate and easily removed.

Moreover, the disintegrable metal and the disintegrable polymer can have different disintegration rates. Thus the hybrid articles can have dual functions. For example, the article can be used to perform a first operation, and after one of the disintegrable metal or disintegrable polymer is selectively degraded, the article can be used to perform a second operation.

In addition, the materials and the structures of the hybrid articles can be controlled to obtain desirable disintegrable rates in different environments. Disintegrable metals can have a high disintegration rate in an acidic environment. To slow down the disintegration, the hybrid articles can contain a degradable polymer which is resistant to acid but is degradable under neutral or basic conditions.

The structures of the hybrid articles are not particularly limited. In an embodiment, the disintegrable metal forms a scaffold and the disintegrable polymer forms a structure surrounding the scaffold.

The scaffold can have several elements. The scaffold or the elements thereof can be machined from a molded or sintered part made from the disintegrable metal. The scaffold or the elements thereof can also be manufactured via an additive manufacturing method, which includes but is not limited to, a selective laser melting process, a selective laser sintering process, or a direct metal deposition process.

The shapes and lengths of the scaffold and its elements are not limited and can be, for example, curved, wavy, or straight. The scaffold element can comprise a perpendicular element, an inner element, an angled element, or a combination comprising one or more of the foregoing. The scaffold elements can welded or screwed together to form the scaffold. The scaffold can also be made as a one piece structure through machining or additive manufacturing as disclosed herein.

The formed scaffold and disintegrable polymer or a precursor thereof can be molded together to form a hybrid article. Alternatively, one or more polymer parts can be formed from a disintegrable polymer via a molding or casting process. The formed polymer parts can then be assembled on the scaffold. The scaffold can also be fixed or attached to the polymer part by mechanical means.

FIG. 1 illustrates a hybrid article 10 comprising a scaffold 12 and a surrounding structure 11, where the scaffold 12 comprises a disintegrable metal and the surrounding structure 11 comprises a disintegrable polymer;

The disintegrable metal can also be dispersed in a matrix formed from a disintegrable polymer as a powder or shavings. The disintegrable powder includes particles of a metal, a metal alloy, or a metal composite as disclosed herein. The shavings of the disintegrable metal can be generated during the machining of a disintegrable metal part. The shavings can be further processed or used as-is to make the hybrid article. In an embodiment, the shavings comprise a metal composite, which comprises: a cellular nanomatrix comprising a metallic nanomatrix material; and a metal matrix disposed in the cellular nanomatrix. To form the hybrid articles comprising dispersed disintegrable metal powder or metal shavings, the metal power and/or metal shavings can be combined with a disintegrable polymer to provide a hybrid composition. The hybrid composition can then be molded or casted to form the hybrid article.

Figure 2:
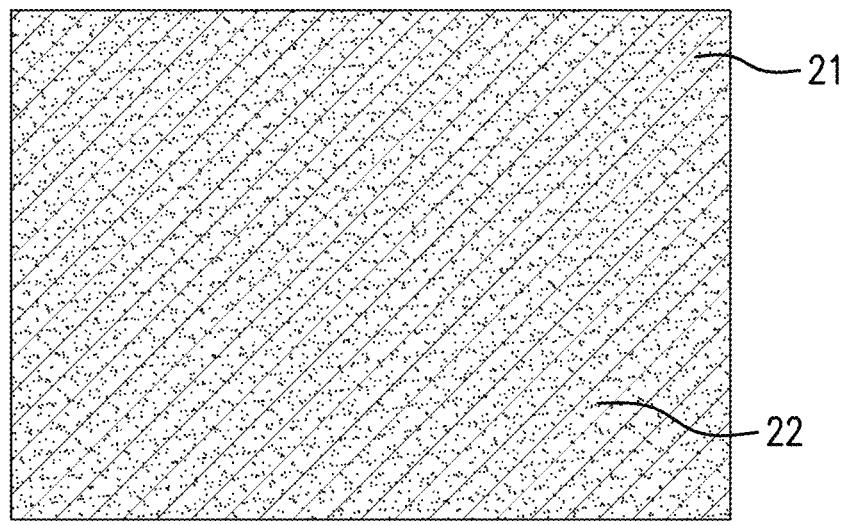
FIG. 2 illustrates a hybrid article comprising a matrix and a powder dispersed in the matrix, where the matrix comprises the disintegrable polymer and the powder comprises the disintegrable metal.
Figure 3:
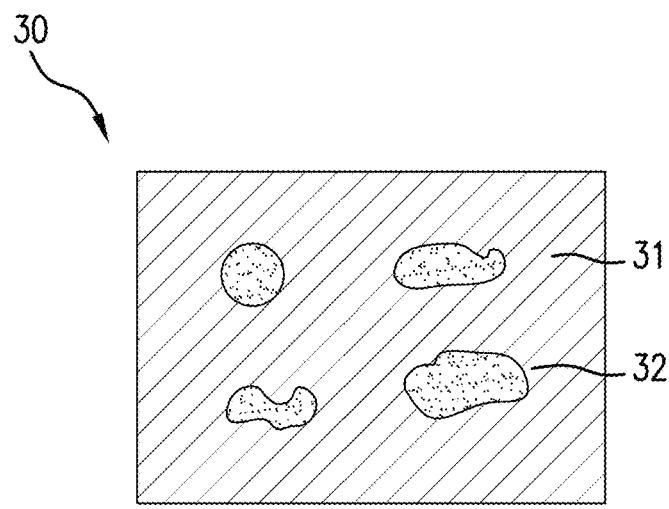
FIG. 3 illustrates a hybrid article comprising a matrix and shavings dispersed in the matrix, where the matrix comprises the disintegrable polymer and the shavings comprise the disintegrable metal.
Figure 4:
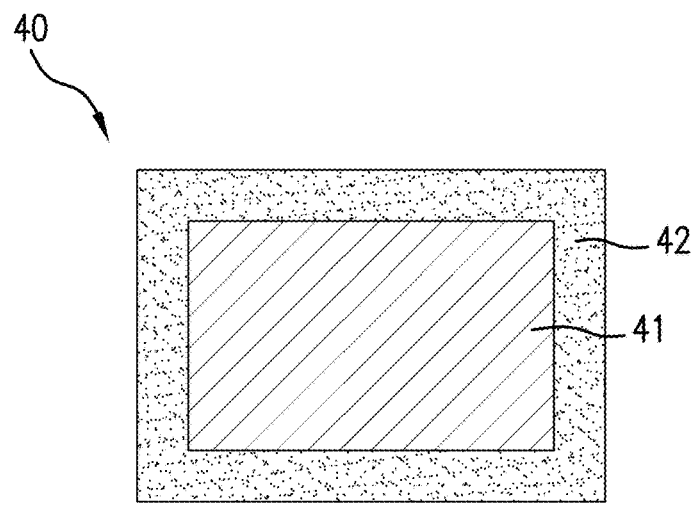
FIG. 4 illustrates a hybrid article comprising a shell at least partially encompassing a core, where the shell comprises the disintegrable polymer and the core comprise the disintegrable metal.

FIG. 2 illustrates a hybrid article 20 comprising a matrix 21 and a powder 22 dispersed in the matrix, where the matrix 21 comprises the disintegrable polymer and the powder 22 comprises the disintegrable metal;

FIG. 3 illustrates a hybrid article 30 comprising a matrix 31 and shavings 32 dispersed in the matrix, where the matrix 31 comprises the disintegrable polymer and the shavings 32 comprise the disintegrable metal;

The hybrid articles can have other structures. FIG. 4 illustrates a hybrid article 40 comprising a shell 42 at least partially encompassing a core 41, where the shell 42 comprises the disintegrable polymer and the core 41 comprise the disintegrable metal. In an embodiment, the disintegrable polymer has a slower degradation rate than the disintegrable metal in an aqueous fluid having a pH of less than 7. The disintegrable polymer in such hybrid articles can comprise a cured epoxy, a cured cyanate ester, or a poly(hexahydrotriazine). In another embodiment, the disintegrable polymer has a faster degradation rate than the disintegrable metal in an aqueous fluid having a pH of greater than 7, and the degradation of the disintegrable polymer is aided by the degradation of the disintegrable metal. Such a disintegrable polymer can be a cured cyanate ester.

Figure 5:
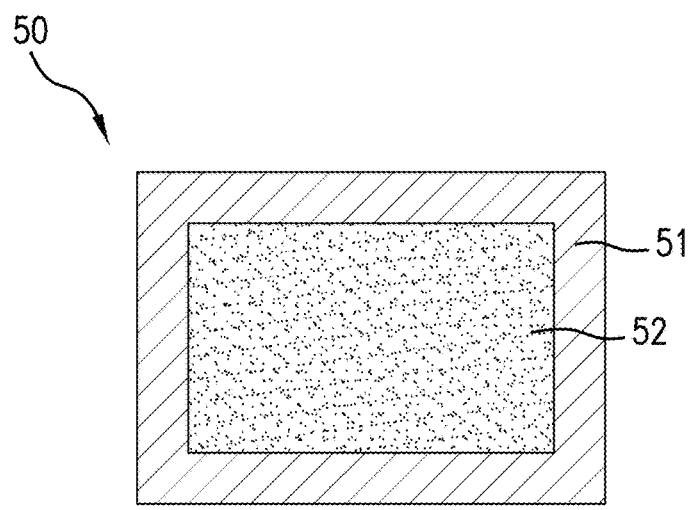
FIG. 5 illustrates a hybrid article comprising a shell at least partially encompassing a core, where the shell comprises the disintegrable metal and the core comprise the disintegrable polymer.

FIG. 5 illustrates a hybrid article 50 comprising a shell 51 at least partially encompassing the core 52, where the shell 51 comprises the disintegrable metal and the core 52 comprise the disintegrable polymer.

The hybrid articles can also comprise a disintegrable metal matrix having a plurality of pores, and a disintegrable polymer disposed in the pores of the metal matrix. Such hybrid articles can be manufactured by forming a metal part from a disintegrable metal, the metal part having a plurality of pores; and disposing a disintegrable polymer in the pores of the metal part under a superatmospheric pressure or a subatmospheric pressure.

The porous structure can be manufactured using an additive manufacturing process in which successive layers of the metallic material are deposited to form the structure. An exemplary manufacturing method includes applying a laser beam or other energy source such as electron-beam to a granular metallic material such as a metallic powder. The laser may selective heat and/or melt the powder in successive layers. The porous structure can be designed to have a uniform pore size, shape and/or distribution, and can also be designed to have selected pore size, shape and/or distribution based on expected article properties. Suitable additive manufacturing method includes a selective laser melting process, a selective laser sintering process, or a direct metal deposition process.

Figure 6:
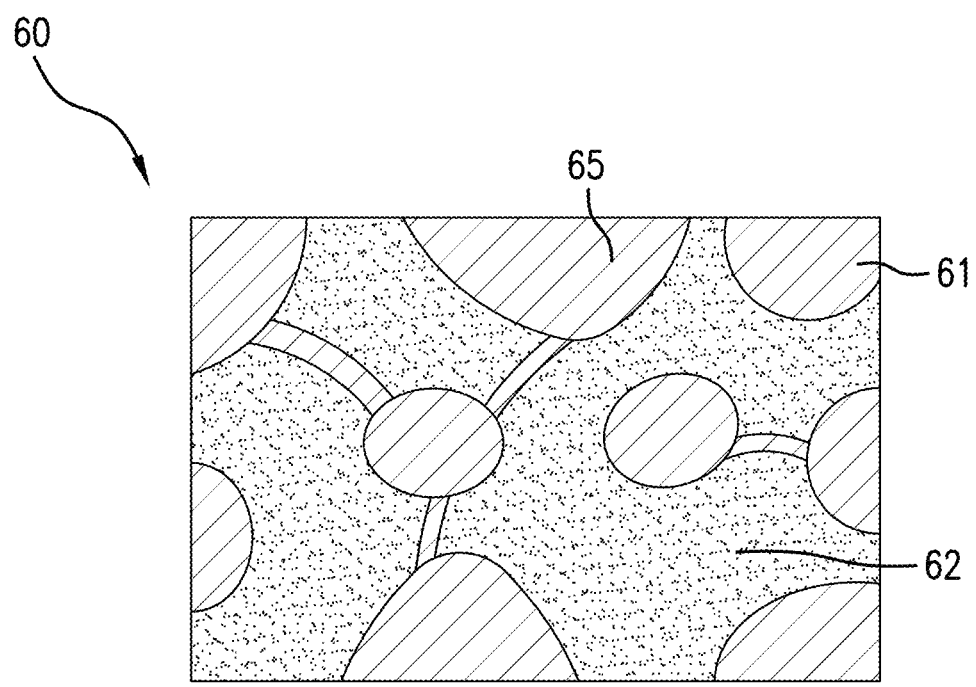
FIG. 6 illustrates a hybrid article comprising a disintegrable metal matrix having a plurality of pores and a disintegrable polymer disposed in the pores of the disintegrable metal matrix.
Figure 7:
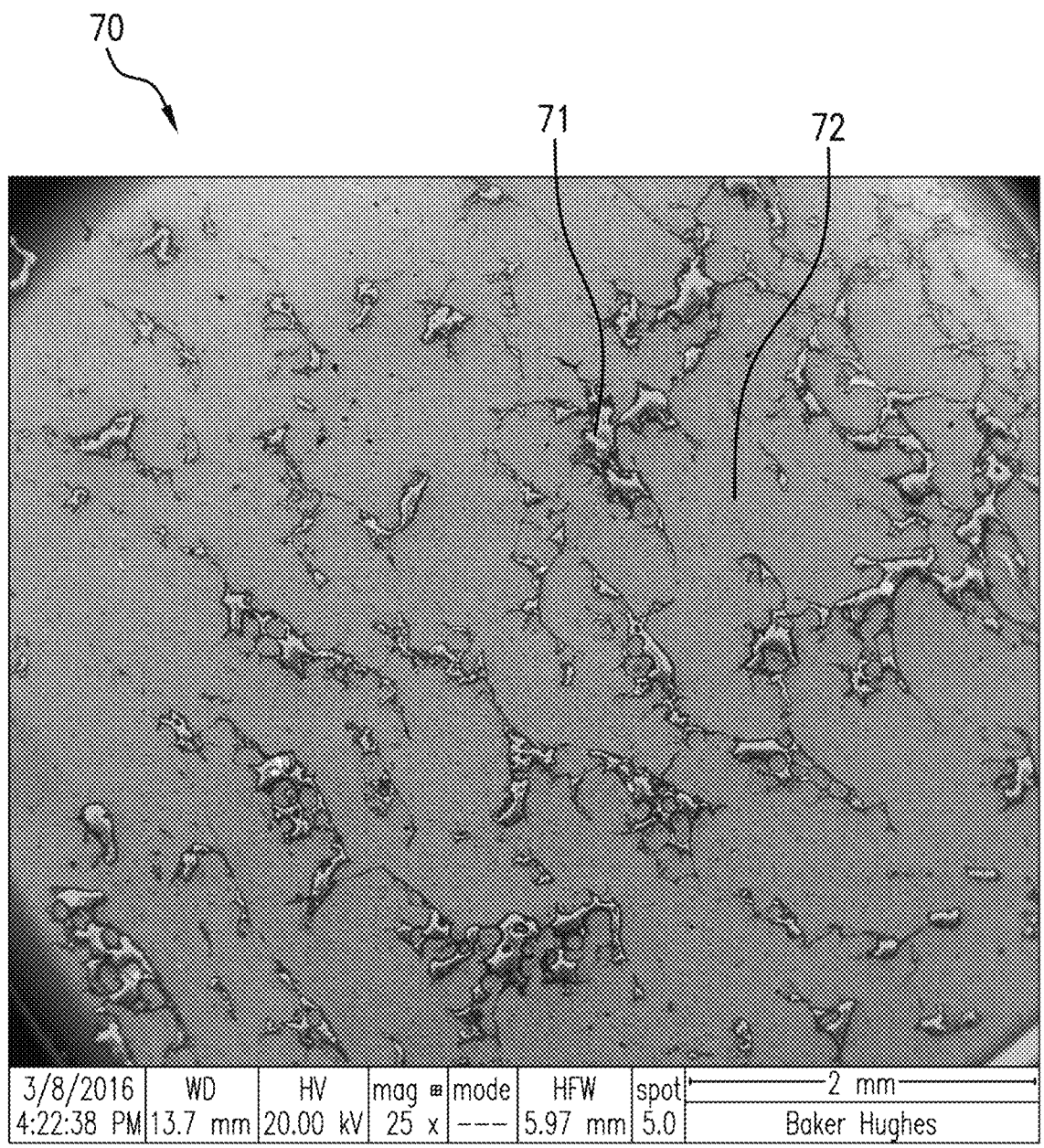
FIG. 7 is a scanning electron microscope image of a metallographic cross section of a hybrid article that was prepared by additive manufacturing a matrix of degradable metal then injecting a degradable polymer into the pore spaces.

In an embodiment, the metal part has a porosity of 1% to 40%, 5% to 30%, or 5% to 20%. FIG. 6 illustrates a hybrid article 60 comprising a disintegrable metal matrix 62 having a plurality of pores 65 and a disintegrable polymer 61 disposed in the pores of the disintegrable metal matrix. FIG. 7 is a scanning electron microscope image of a metallographic cross section of a hybrid article 70 that was prepared by additive manufacturing a matrix 72 of degradable metal to 90% dense (porosity of 10%) and then injecting a degradable polymer 71 into the pore spaces. The additive manufactured metal part had a compressive strength of 32.8 and 32.9. After a disintegrable polymer is injected into the pores of the metal part, the hybrid article had a compressive strength of 38.6 and 35.3, which is higher than the porous metal part. The porous metal part and the hybrid article can have comparable failure percent.

The materials for the disintegrable metal and the disintegrable polymer are described in more detail below.

The disintegrable metal can be a metal, a metal alloy, a composite of the metal, a composite of the metal alloy, or a combination comprising at least one of the foregoing. The metal includes electrochemically active metals having a standard oxidation potential greater than or equal to that of Zn, including at least one of the following: Mg; Al; Mn; or Zn. These electrochemically active metals are reactive with a number of common wellbore fluids, including any number of ionic fluids or highly polar fluids, such as those that contain various chlorides. The disintegrable metal may also include other metals that are less electrochemically active than Zn or non-metallic materials, or a combination thereof. Suitable non-metallic materials include ceramics, composites, glasses or carbon, or a combination thereof.

With regard to the electrochemically active metals, including Mg, Al, Mn or Zn, these metals may be used as pure metals or in any combination with one another, including various alloy combinations of these materials, including binary, tertiary, or quaternary alloys of these materials. These combinations may also include composites of these materials. Further, in addition to combinations with one another, the Mg, Al, Mn or Zn core materials may also include other constituents, including various alloying additions, to alter one or more properties of the particle cores, such as by improving the strength, lowering the density or altering the degradation characteristics of the disintegrable metal.

Among the electrochemically active metals, Mg, either as a pure metal or an alloy or a composite material, is particularly useful, because of its low density and ability to form high-strength alloys, as well as its high degree of electrochemical activity, since it has a standard oxidation potential higher than Al, Mn or Zn. Mg alloys include all alloys that have Mg as an alloy constituent. Mg alloys that combine other electrochemically active metals, as described herein, as alloy constituents are particularly useful, including binary Mg—Zn, Mg—Al and Mg—Mn alloys, as well as tertiary Mg—Zn—Y and Mg—Al—X alloys, where X includes Zn, Mn, Si, Ca or Y, or a combination thereof. These Mg—Al—X alloys may include, by weight, up to about 85% Mg, up to about 15% Al and up to about 5% X. Particle core including Mg, Al, Mn or Zn, or combinations thereof, may also include a rare earth element or combination of rare earth elements. As used herein, rare earth elements include Sc, Y, La, Ce, Pr, Nd or Er, or a combination of rare earth elements. Where present, a rare earth element or combinations of rare earth elements may be present, by weight, in an amount of about 5% or less.

Aluminum-based alloys include all alloys that have aluminum as an alloy constituent. Exemplary aluminum alloys include Al—Cu alloy, Al—Mn alloy, Al—Si alloy, Al—Mg alloy, Al—Mg—Si alloy, Al—Zn alloy, Al—Li alloy, Al—Cu—Mg—X alloy, Al—Zn—Mg—Cu—X, where X represents alloying elements including Zn, Mn, Si, Cr, Fe, Ni, Ti, V, Cu, Pb, Bi, and Zr.

Zinc-based alloys include alloys of zinc with Al, Cu, Mg, Pb, Cd, Sn, Fe, Ni, Si, or a combination of the above elements. In a specific embodiment, the metallic matrix material is a magnesium alloy.

As used herein, the term "metal-based alloy" means a metal alloy wherein the weight percentage of the specified metal in the alloy is greater than the weight percentage of any other component of the alloy, based on the total weight of the alloy.

The disintegrable metal can also include or be made from coated particles. As used herein, coated particles refer to particles having a particle core and a nanoscale metallic coating layer disposed on the particle core. Suitable core materials include the metal such as Mg, Al, Mn, or Zn or their alloys as disclosed herein.

Metallic coating is a nanoscale coating layer. In an exemplary embodiment, metallic coating may have a thickness of about 25 nm to about 2500 nm. Metallic coating may include a single layer or a plurality of layers as a multilayer coating structure for up to four layers. In a single layer coating, or in each of the layers of a multilayer coating, the metallic coating layer may include a single constituent chemical element or compound, or may include a plurality of chemical elements or compounds.

Metallic coating material includes one or more of the following: Al; Zn; Mn; Mg; Mo; W; Cu; Fe; Si; Ca; Co; Ta; Re; or Ni; or an oxide; nitride or a carbide thereof. In an embodiment, metallic coating comprises one or more of the following: aluminum oxide; Al—Cu alloy; Al—Mn alloy; Al—Si alloy; Al—Mg alloy; Al—Mg—Si alloy; Al—Zn alloy; Al—Li alloy; Al—Cu—Mg—X alloy; or Al—Zn—Mg—Cu—X; and X is one or more of the following: Zn; Mn; Si; Cr; Fe; Ni; Ti; V; Cu; Pb; Bi; or Zr.

In yet another exemplary embodiment, the coating includes two layers. The first layer is disposed on the surface of particle core and includes Al or Ni, or a combination thereof, the second layer is disposed on the surface of the first layer and includes Al, Zn, Mg, Mo, W, Cu, Fe, Si, Ca, Co, Ta, Re or Ni, or a combination thereof, and the first layer has a chemical composition that is different than the chemical composition of the second layer. Exemplary embodiments of a two-layer metallic coating layers for use on particles cores comprising Mg include first/second layer combinations comprising Al/Ni and Al/W.

In still another embodiment, the coating layer includes three layers. The first layer is disposed on particle core and may include Al or Ni, or a combination thereof. The second layer is disposed on first layer and may include Al, Zn, Mg, Mo, W, Cu, Fe, Si, Ca, Co, Ta, Re or Ni, or an oxide, nitride or a carbide thereof, or a combination of any of the aforementioned second layer materials. The third layer is disposed on the second layer and may include Al, Mn, Fe, Co, Ni or a combination thereof. In a three-layer configuration, the composition of adjacent layers is different. An exemplary embodiment of a three-layer coating layer for use on particles cores comprising Mg include first/second/third layer combinations comprising Al/Al$_2$O$_3$/Al.

In still another embodiment, the coating includes four layers, wherein the first layer disposed on the core may include Al or Ni, or a combination thereof, the second layer disposed on the first layer and the third layer disposed on the second layer may independently include one or more of Al; Zn; Mg; Mo; W; Cu; Fe; Si; Ca; Co; Ta; Re; or Ni or an oxide; nitride; carbide thereof; and the fourth layer disposed on the third layer may include Al, Mn, Fe, Co, Ni or a combination thereof. In the four-layer configuration, the chemical composition of adjacent layers is different.

The metal composite is, for example, a powder compact. The metal composite includes a cellular nanomatrix comprising a nanomatrix material and a metal matrix (e.g., a plurality of dispersed particles) comprising a particle core material dispersed in the cellular nanomatrix. The particle core material comprises a nanostructured material. Such a metal composite having the cellular nanomatrix with metal matrix disposed therein is referred to as controlled electrolytic metallic. The metal composite is known and has been described in U.S. Pat. Nos. 9,101,978, 9,079,246, 9,090,956, and 9,033,060.

The metal matrix can be formed from particle cores of the coated particles and the cellular nanomatrix can be formed from the coatings of the coated particles. In an embodiment, the metal matrix include magnesium or a magnesium alloy and the cellular nanomatrix includes aluminum, calcium, molybdenum, cobalt, copper, iron, magnesium, nickel, silicon, zinc, an intermetallic compound thereof, or a combination thereof. The metal matrix can be present in an amount from 50 wt % to 95 wt %, specifically 60 wt % to 95 wt %, and more specifically 70 wt % to 95 wt %, based on the weight of the composite. Further, the amount of the metal nanomatrix material is 10 wt % to 50 wt %, specifically 20 wt % to 50 wt %, and more specifically 30 wt % to 50 wt %, based on the weight of the composite.

In metal composite, the metal matrix dispersed throughout the cellular nanomatrix can have an equiaxed structure in a substantially continuous cellular nanomatrix or can be substantially elongated along an axis so that individual particles of the metal matrix are oblately or prolately shaped, for example. In the case where the metal matrix has substantially elongated particles, the metal matrix and the cellular nanomatrix may be continuous or discontinuous. The size of the particles that make up the metal matrix can be from 50 nm to 800 µm, specifically 500 nm to 600 µm, and more specifically 1 µm to 500 µm. The particle size can be monodisperse or polydisperse, and the particle size distribution can be unimodal or bimodal. Size here refers to the largest linear dimension of a particle.

The disintegrable polymer in the hybrid article includes one or more of the following: an epoxy polymer derived from an epoxy base and a curing agent having cleavable bonds; a cured cyanate ester; or a poly(hexahydrotriazine).

The epoxy base includes a glycidyl ether epoxy resin, glycidyl ester epoxy resin, glycidyl amine epoxy resin, trifunctional epoxy resin, tetrafunctional epoxy resin, novolac epoxy resin, cresol-novolac epoxy resin, aliphatic epoxy resin, alicyclic epoxy resin, or nitrogen containing epoxy resin. In an embodiment, the epoxy base is bisphenol A diglycidyl ether, for example, Epon* 828, commercially available from Momentive Performance Materials Inc.

The epoxy base can be cured or crosslinked under known conditions using the curing agent described herein. The cured or crosslinked epoxy polymer can have a density of 1.2 g/cc, and a glass transition temperature (Tg) of about 100° C. to about 300° C. Thus, a load bearing property of the cured or crosslinked epoxy polymer can conveniently be utilized towards its entire glassy region. Further extension of the glassy region is possible.

Degradable or dissolvable curing agents include those disclosed in US Patent Publication Nos. 2013/0245204 and 2014/0221510 and WO 2014/169847, the disclosure of each of which is incorporated herein by reference in its entirety. The curing agents have at least one cleavable bond, which can be cleaved upon exposure to an organic acid or an acidified ethylene glycol. In an embodiment, the curing agent is a polyamine such as a diamine. Exemplary degradable curing agents are Recyclamine* commercially available from Connora Tech. and Cleavamine* commercially available from Addesso Advanced Materials.

Cyanate esters are compounds generally based on a phenol or a novolac derivative, in which the hydrogen atom of the phenolic OH group is substituted by a cyanide group (—OCN). Suitable cyanate esters include those described in U.S. Pat. No. 6,245,841 and EP 0396383. In an embodiment, cyanate esters are based on resorcinol, p,p'-dihydroxydiphenyl, o,p'-dihydroxydiphenyl methane, 2,2-bis(4-hydroxyphenyl)propane (bisphenol A), tetramethylbisphenol F, hexafluorobisphenol A, bisphenol E, bisphenol M, dicyclopentadienyl bisphenol, o,p'-dihydroxydiphenyl methane, p,p'-dihydroxydiphenyl propane, p,p'-dihydroxydiphenyl sulfone, p,p'-dihydroxydiphenyl sulfide, p,p'-dihydroxydiphenyl oxide, 4,4'-methylenebis(2,6-dimethyl phenol), p,p"p"'-tri-hydroxy triphenyl ethane, dihydroxynaphthalene and novolac resins which contain more than 2 phenol moieties per moleculeor, or a combination thereof.

Cyanate esters can be cured and postcured by heating, either alone, or in the presence of a catalyst. Curing normally occurs via cyclotrimerization (an addition process) of three CN groups to form three-dimensional networks comprising triazine rings. The residual cyanate ester content can be determined quantitatively by methods known in the art, for example, by infrared analysis or by "residual heat of reaction" using a differential scanning calorimeter.

As used herein, a "cured cyanate ester" means that cyanate ester monomers are cured until at least about 70 percent, at least about 80 percent, at least about 85 percent, or at least about 90 percent of the cyanate functional groups are cyclotrimerized. The curing reaction can be conducted at about 150° F. to about 600° F. or about 200° F. to about 500° F. If a catalyst is present, the curing temperature can be lower. Suitable curing catalysts include an active-hydrogen catalyst or transition metal complexes of cobalt, copper, manganese and zinc. Advantageously, cured cyanate esters are controllably degradable in water or brine at elevated temperatures.

A hemiaminal refers to a compound that has a hydroxyl group and an amine attached to the same carbon atom. To produce a hemiaminal, a diamine and a formaldehyde are reacted in the presence of a reaction medium. The reaction produces a hemiaminal dynamic covalent network (HDCN). Exemplary diamines include 4,4'-oxydianiline, 4,4'-diaminodiphenylmethane, 3,3'-methylenedianiline, and 4-aminophenyl sulfone. As used herein, formaldehyde includes paraformaldehyde, which is the polymerization production of formaldehyde with a typical degree of polymerization of about 8 to about 100 units. The molar ratio between the diamine and the formaldehyde is about 1:5 to about 3:10, or 2:5 to about 1:2.

The HDCNs can be molded into articles having different shapes. During the molding process, the HDCNs are converted to poly(hexahydrotriazine)s. The molding process is not particularly limited. The HDCNs are placed in a mold and heated to a temperature that is, for example, about 100° C. to about 400° C., specifically about 150° C. to about 350° C., and more specifically about 150° C. to about 300° C., and held at this temperature for about 2 hours to about 10 hours. While the HDCNs are at the elevated temperature, a compressive force is applied. The force is, for example, about 10,000 pounds per square inch (psi) to about 25,000 psi, specifically about 12,000 to about 20,000 psi, and more specifically about 15,000 psi to about 20,000 psi.

The amounts of the polymer component and the metal component can be adjusted to balance the disintegration rate and the desirable physical properties. In an embodiment, the weight ratio of the disintegrable polymer relative to the disintegrable metal in the hybrid article is about 10:1 to about 1:2, about 3:1 to about 1:1.5, or about 2:1 to about 1:1.5, or about 2:1 to about 1:1.

The article can be a single component article. In an embodiment, the articles inhibit flow. In another embodiment, the articles are pumpable within a downhole environment. In still another embodiment, the articles are degradable in a downhole environment.

Illustrative single component articles include flappers, hold down dogs and springs, screen protectors, seal bore protectors, electric submersible pump space out subs, full bore guns, chemical encapsulations, slips, dogs, springs and collet restraints, liner setting sleeves, timing actuation devices, emergency grapple release, chemical encapsulation containers, screen protectors, beaded screen protectors, whipstock lugs, whipstock coatings, pins, set screws, emergency release tools, gas generators, mandrels, release mechanisms, staging collars, C-rings, components of perforating gun systems, disintegrable whipstock for casing exit tools, shear pins, dissolvable body locking rings, mud motor stators, progressive cavity pump stators, and shear screws.

Illustrative articles that inhibit flow include seals, high pressure beaded frac screen plugs, screen basepipe plugs, coatings for balls and seats, compression packing elements, expandable packing elements, O-rings, bonded seals, bullet seals, sub-surface safety valve seals, sub-surface safety valve flapper seal, dynamic seals, V-rings, back up rings, drill bit seals, liner port plugs, atmospheric discs, atmospheric chamber discs, debris barriers, drill in stim liner plugs, inflow control device plugs, flappers, seats, ball seats, direct connect disks, drill-in linear disks, gas lift valve plug, fluid loss control flappers, electric submersible pump seals, shear out plugs, flapper valves, gaslift valves, and sleeves.

Illustrative articles that are pumpable include plugs, direct connect plugs, bridge plugs, wiper plugs, frac plugs, components of frac plugs, drill in sand control beaded screen plugs, inflow control device plugs, polymeric plugs, disappearing wiper plugs, cementing plugs, balls, diverter balls, shifting and setting balls, swabbing element protectors, buoyant recorders, pumpable collets, float shoes, and darts.

The article can be a downhole article. In a specific embodiment, articles include, for example a ball, a ball seat, a fracture plug, or other such downhole article.

Methods to disintegrate hybrid articles comprises: exposing the polymer composite or the article to a fluid at a temperature of about 25° C. to about 300° C., about 65° C. to about 250° C., or about 65° C. to about 150° C. or about 175° C. to about 250° C. The pressure can be about 100 psi to about 45,000 psi.

The fluid includes water, brine, an acid, an acidified ethylene glycol, an alkaline solution, or a combination thereof. The brine can include NaCl, KCl, NaBr, $MgCl_2$, $CaCl_2$, $CaBr_2$, $ZnBr_2$, $NH_4Cl$, sodium formate, cesium formate, and the like. The alkaline solution can include an alkaline salt of one or more of the following: Na; K; Ca; Mg; Li; or Ce. The salts present in the brine or the alkaline solution can be in an amount of from about 0.5 weight percent (wt. %) to about 50 wt. %, specifically about 1 wt. % to about 40 wt. %, and more specifically about 1 wt. % to about 25 wt. %, based on the weight of the brine or the alkaline solution. The acid includes an inorganic acid or an inorganic acid.

The hybrid articles can have controlled chemical and physical properties at different locations. Thus, the articles according to disclosure can have dual functions. In an embodiment, the metal or polymer has a higher disintegration rate than the other. The article can be used to perform a first operation. After exposing the article to the fluid, the metal or polymer portion of the article is selectively degraded, i.e., completely or partially removed to provide a degraded article; which can be used to perform a second operation that is different from the wellbore operation. In an embodiment, the article is a downhole article, the fluid is a wellbore fluid, and the first and second operations are wellbore operations.

Set forth below are some embodiments of the disclosure:

Embodiment 1

A hybrid article includes a disintegrable metal including one or more of the following: Mg; Al; Zn; Mn; an alloy thereof; or a composite thereof; and a disintegrable polymer comprising one or more of the following: an epoxy polymer derived from an epoxy base and a curing agent having cleavable bonds; a cured cyanate ester; or a poly(hexahydrotriazine).

Embodiment 2

The article of any prior embodiment wherein the article includes a scaffold and a surrounding structure. The scaffold includes the disintegrable metal and the surrounding structure including the disintegrable matrix.

Embodiment 3

The article of Embodiment 1 wherein the disintegrable polymer forms a matrix, and the disintegrable metal is dispersed in the matrix as a powder.

Embodiment 4

The article of Embodiment 1 wherein the disintegrable polymer forms a matrix and the disintegrable metal is dispersed in the matrix as shavings.

Embodiment 5

The article of Embodiment 4 wherein the shavings includes a metal composite which includes: a cellular nanomatrix comprising a metallic nanomatrix material; and a metal matrix disposed in the cellular nanomatrix.

Embodiment 6

The article of Embodiment 1 wherein the article includes a shell at least partially encompassing a core, with the disintegrable metal included in the shell and the disintegrable polymer included in the core.

Embodiment 7

The article of Embodiment 1 wherein the article includes a shell at least partially encompassing a core, with the disintegrable polymer included in the shell and the disintegrable metal included in the core.

Embodiment 8

The article of any prior embodiment wherein the disintegrable polymer has a slower degradation rate than the disintegrable metal in an aqueous fluid having a pH of less than 7.

Embodiment 9

The article of Embodiment 8 wherein the disintegrable polymer includes a cured epoxy, a cured cyanate ester, or a poly(hexahydrotriazine).

Embodiment 10

The article of any of Embodiments 1 to 7 wherein the disintegrable polymer has a faster degradation rate than the disintegrable metal in an aqueous fluid having a pH of greater than 7, and the degradation of the disintegrable polymer is aided by the degradation of the disintegrable metal.

Embodiment 11

The article of Embodiment 10 wherein the disintegrable polymer is a cured cyanate ester.

Embodiment 12

The article of any of Embodiments 1 or 8-11 wherein the disintegrable metal forms a matrix having a plurality of pores, and the disintegrable polymer is disposed in the pores of the matrix.

Embodiment 13

The article of any prior embodiment wherein the article is a pumpable downhole tool comprising a plug, a direct connect plug, a bridge plug, a wiper plug, a frac plug, a component of a frac plug, a drill in sand control beaded screen plug, an inflow control device plug, a polymeric plug, a disappearing wiper plug, a cementing plug, a ball, a diverter ball, a shifting and setting ball, a swabbing element protector, a buoyant recorder, a pumpable collet, a float shoe, or a dart.

Embodiment 14

The article of any of Embodiments 1 to 12 wherein the article is downhole tool that inhibits flow comprising a seal, a high pressure beaded frac screen plug, a screen basepipe plug, a coating for a balls and a seat, a compression packing element, an expandable packing element, an O-ring, a bonded seal, a bullet seal, a sub-surface safety valve seal, a sub-surface safety valve flapper seal, a dynamic seal, a V-ring, a backup ring, a drill bit seal, a liner port plug, an atmospheric disc, an atmospheric chamber disc, a debris barrier, a drill in stim liner plug, an inflow control device plug, a flapper, a seat, a ball seat, a direct connect disk, a drill-in linear disk, a gas lift valve plug, a fluid loss control flapper, an electric submersible pump seal, a shear out plug, a flapper valve, a gaslift valve, or a sleeve.

Embodiment 15

A method of manufacturing a hybrid article. The method includes forming a scaffold from a disintegrable metal including one or more of the following: Mg; Al; Zn; Mn; an alloy thereof; or a composite thereof; and forming a structure surrounding the disintegrable metal from a disintegrable polymer via molding or casting, the disintegrable polymer including one or more of the following: an epoxy polymer derived from an epoxy base and a curing agent having cleavable bonds; a cured cyanate ester; a poly(hexahydrotriazine); or a precursor thereof.

Embodiment 16

A method of manufacturing a hybrid article. The method includes forming a scaffold from a disintegrable metal including one or more of the following: Mg; Al; Zn; Mn; an alloy thereof; or a composite thereof; forming a polymer part from a disintegrable polymer including one or more of the following: an epoxy polymer derived from an epoxy base and a curing agent having cleavable bonds; a cured cyanate ester; a poly(hexahydrotriazine); or a precursor thereof; and attaching or fixing the polymer part to the scaffold.

Embodiment 17

The method of Embodiment 15 or 16 wherein the method further includes forming the scaffold by additive manufacturing.

Embodiment 18

The method of any of Embodiments 15 to 17 wherein the method further includes forming two or more scaffold element, and joining the two or more scaffold element to provide the scaffold.

Embodiment 19

A method of manufacturing a disintegrable hybrid article. The method includes combining a disintegrable metal power or shavings with a disintegrable polymer to provide a hybrid composition, the disintegrable metal powder including one or more of the following: Mg; Al; Zn; Mn; an alloy thereof; or a composite thereof. The disintegrable metal shavings include a metal composite which include: a cellular nanomatrix comprising a metallic nanomatrix material; and a metal matrix disposed in the cellular nanomatrix. The disintegrable polymer includes one or more of the following: an epoxy polymer derived from an epoxy base and a curing agent having cleavable bonds; a cured cyanate ester; a poly(hexahydrotriazine); or a precursor thereof. The method further includes molding the hybrid composition to form the disintegrable hybrid article and combining a disintegrable metal power or shavings with a disintegrable polymer to provide a hybrid composition. The disintegrable metal powder includes one or more of the following: Mg; Al; Zn; Mn; an alloy thereof; or a composite thereof. The disintegrable metal shavings include a metal composite which include: a cellular nanomatrix comprising a metallic nanomatrix material; and a metal matrix disposed in the cellular nanomatrix. The disintegrable polymer include one or more of the following: an epoxy polymer derived from an epoxy base and a curing agent having cleavable bonds; a cured cyanate ester; a poly(hexahydrotriazine); or a precursor thereof. The method further includes molding the hybrid composition to form the disintegrable hybrid article.

Embodiment 20

A method of manufacturing a disintegrable hybrid article. The method includes forming a metal part from a disintegrable metal via an additive manufacturing method, the metal part having a plurality of pores. The method further includes disposing a disintegrable polymer in the pores of the metal part under a superatmospheric pressure or a subatmospheric pressure. The disintegrable metal includes one or more of the following: Mg; Al; Zn; Mn; an alloy thereof; or a composite thereof. The disintegrable polymer includes one or more of the following: an epoxy polymer derived from an epoxy base and a curing agent having cleavable bonds; a cured cyanate ester; or a poly(hexahydrotriazine); or a precursor thereof.

Embodiment 21

The article or the method of any prior embodiment wherein the epoxy base includes one or more of the following: a glycidyl ether epoxy resin; glycidyl ester epoxy resin; glycidyl amine epoxy resin; trifunctional epoxy resin; tetrafunctional epoxy resin; novolac epoxy resin; cresol-novolac epoxy resin; aliphatic epoxy resin; alicyclic epoxy resin; or nitrogen containing epoxy resin; and the curing agent is a polyamine.

Embodiment 22

The article or the method of any prior embodiment wherein the cured cyanate ester includes cyclotrimerized cyanate functional groups.

Embodiment 23

The article or the method of any prior embodiment wherein the poly(hexahydrotriazine) is derived from a hemiaminal dynamic covalent network.

Embodiment 24

The article or the method of Embodiment 23 wherein the hemiaminal dynamic covalent network is derived from a diamine and formaldehyde.

Embodiment 25

The article or the method of any prior embodiment wherein the disintegrable metal includes one or more of the following: a magnesium-based alloy; an aluminum-based alloy; or a zinc-based alloy. Optionally a component includes one or more of the following: a metal; an oxide of the metal; a nitride of the metal; or a cermet of the metal; wherein the metal is W; Co; Cu; Ni; or Fe.

Embodiment 26

The article or the method of any prior embodiment wherein the degradable metal includes a metal composite which includes: a cellular nanomatrix comprising a metallic nanomatrix material; and a metal matrix disposed in the cellular nanomatrix.

Embodiment 27

The article or the method of any prior embodiment wherein the metal matrix includes magnesium. The metallic nanomatrix material includes aluminum, calcium, cobalt, copper, iron, molybdenum, nickel, silicon, zinc, an intermetallic compound thereof, or a combination thereof.

Embodiment 28

A method to disintegrate an article includes exposing the article to a fluid comprising one or more of the following: water; brine; an acid; a base; or an acidified ethylene glycol.

Embodiment 29

The method of Embodiment 28 wherein the article is exposed to the fluid at a temperature of about 25° F. to about 500° F.

Embodiment 30

The method of Embodiment 28 or 29 wherein the article is exposed to the fluid at a pressure of about 100 psi to about 45,000 psi.

Embodiment 31

A method of using an article includes forming the article. The article includes a first portion that is degradable in a fluid at a first degradation rate and a second portion that is degradable in the fluid at a second degradation rate. The first degradation rate is greater than the second degradation rate. The method further includes using the article to perform a first operation, exposing the article to the fluid, and selectively degrading the first portion of the article to provide a degraded article. The method further includes using the degraded article to perform a second operation that is different from the first operation, wherein the first portion includes a disintegrable metal and the second portion includes disintegrable polymer or the first portion comprises a disintegrable polymer and the second portion includes a disintegrable metal.

Embodiment 32

The method of Embodiment 31 wherein the article is a downhole article, the fluid is a wellbore fluid, and the first and second operations are wellbore operations.

Embodiment 33

The method of Embodiment 31 or 32 wherein the fluid includes one or more of the following: water; brine; an acid; a base; or an acidified ethylene glycol.

All ranges disclosed herein are inclusive of the endpoints, and the endpoints are independently combinable with each other. "Or" means "and/or." As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A hybrid article comprising:
   a disintegrable metal comprising a magnesium-based alloy; and a component comprising one or more of the following: W; Co; Cu; Ni; or Fe, an oxide of W; Co; Cu; Ni; or Fe, a nitride of W; Co; Cu; Ni; or Fe; or a cermet of W; Co; Cu; Ni; or Fe; and
   a disintegrable polymer comprising one or more of the following: an epoxy polymer derived from an epoxy base and a curing agent having cleavable bonds; a cured cyanate ester; or a poly(hexahydrotriazine),
   wherein the magnesium-based alloy comprises magnesium in a weight percent that is greater than the sum of the weight percent of all other components in the magnesium-based alloy.

2. The article of claim 1, wherein the article comprises a scaffold and a surrounding structure, the scaffold comprising the disintegrable metal and the surrounding structure comprising the disintegrable polymer.

3. The article of claim 1, wherein the disintegrable polymer forms a matrix, and the disintegrable metal is dispersed in the matrix as a powder.

4. The article of claim 1, wherein the disintegrable polymer forms a matrix and the disintegrable metal is dispersed in the matrix as shavings.

5. The article of claim 4, wherein the shavings comprises a metal composite which comprises: a cellular nanomatrix comprising a metallic nanomatrix material; and a metal matrix disposed in the cellular nanomatrix.

6. The article of claim 1, wherein the article comprises a shell at least partially encompassing a core, with the disintegrable metal included in the shell and the disintegrable polymer included in the core.

7. The article of claim 1, wherein the article comprises a shell at least partially encompassing a core, with the disintegrable polymer included in the shell and the disintegrable metal included in the core.

8. The article of claim 7, wherein the disintegrable polymer has a slower degradation rate than the disintegrable metal in an aqueous fluid having a pH of less than 7.

9. The article of claim 8, wherein the disintegrable polymer comprises the epoxy polymer, the cured cyanate ester, or the poly(hexahydrotriazine).

10. The article of claim 7, wherein the disintegrable polymer has a faster degradation rate than the disintegrable metal in an aqueous fluid having a pH of greater than 7, and the degradation of the disintegrable polymer is aided by the degradation of the disintegrable metal.

11. The article of claim 10, wherein the disintegrable polymer is the cured cyanate ester.

12. The article of claim 1, wherein the disintegrable metal forms a matrix having a plurality of pores, and the disintegrable polymer is disposed in the pores of the matrix.

13. The article of claim 1, wherein the disintegrable polymer comprises the epoxy polymer derived from the epoxy base and the curing agent having cleavable bonds, and the epoxy base comprises one or more of the following: glycidyl ether epoxy resin; glycidyl ester epoxy resin; glycidyl amine epoxy resin; trifunctional epoxy resin; tetrafunctional epoxy resin; novolac epoxy resin; cresol-novolac epoxy resin; aliphatic epoxy resin; alicyclic epoxy resin; or nitrogen containing epoxy resin; and the curing agent is a polyamine.

14. The article of claim 1, wherein the disintegrable polymer comprises the cured cyanate ester, and the cured cyanate ester comprises cyclotrimerized cyanate functional groups.

15. The article of claim 1, wherein the disintegrable polymer comprises the poly(hexahydrotriazine), and the poly(hexahydrotriazine) is derived from a hemiaminal dynamic covalent network.

16. The article of claim 15, wherein the hemiaminal dynamic covalent network is derived from a diamine and formaldehyde.

17. The article of claim 1, wherein the article is a pumpable downhole tool comprising a plug, a direct connect plug, a bridge plug, a wiper plug, a frac plug, a component of a frac plug, a drill in sand control beaded screen plug, an inflow control device plug, a polymeric plug, a disappearing wiper plug, a cementing plug, a ball, a diverter ball, a shifting and setting ball, a swabbing element protector, a buoyant recorder, a pumpable collet, a float shoe, or a dart.

18. The article of claim 1, wherein the article is downhole tool that inhibits flow comprising a seal, a high pressure beaded frac screen plug, a screen basepipe plug, a coating for a balls and a seat, a compression packing element, an expandable packing element, an O-ring, a bonded seal, a bullet seal, a sub-surface safety valve seal, a sub-surface safety valve flapper seal, a dynamic seal, a V-ring, a backup ring, a drill bit seal, a liner port plug, an atmospheric disc, an atmospheric chamber disc, a debris barrier, a drill in stim liner plug, an inflow control device plug, a flapper, a seat, a ball seat, a direct connect disk, a drill-in linear disk, a gas lift valve plug, a fluid loss control flapper, an electric submersible pump seal, a shear out plug, a flapper valve, a gaslift valve, or a sleeve.

19. A method of manufacturing the hybrid article of claim 1, the method comprising:
   forming a scaffold from a disintegrable metal comprising a magnesium-based alloy; and a component comprising one or more of the following: W; Co; Cu; Ni; or Fe, an oxide of W; Co; Cu; Ni; or Fe, a nitride of W; Co; Cu; Ni; or Fe; or a cermet of W; Co; Cu; Ni; or Fe; and
   forming a structure surrounding the disintegrable metal from a disintegrable polymer via molding or casting or forming a polymer part from the disintegrable polymer and attaching or fixing the polymer part to the scaffold, the disintegrable polymer comprising one or more of the following: an epoxy polymer derived from an epoxy base and a curing agent having cleavable bonds; a cured cyanate ester; a poly(hexahydrotriazine); or a precursor thereof, wherein the magnesium-based alloy comprises magnesium in a weight percent that is greater than the sum of the weight percent of all other components in the magnesium-based alloy.

20. The method of claim 19, further comprising forming the scaffold by additive manufacturing.

21. The method of claim 19, further comprising forming two or more scaffold element, and joining the two or more scaffold element to provide the scaffold.

22. A method of manufacturing the disintegrable hybrid article of claim 1, the method comprising:
   forming a metal part from a disintegrable metal via an additive manufacturing method, the metal part having a plurality of pores; and disposing a disintegrable polymer in the pores of the metal part under a superatmospheric pressure or a subatmospheric pressure, wherein the disintegrable metal comprises a magnesium-based alloy; and a component comprising one or more of the following: W; Co; Cu; Ni; or Fe, an oxide of W; Co; Cu; Ni; or Fe, a nitride of W; Co; Cu; Ni; or Fe; or a cermet of W; Co; Cu; Ni; or Fe; and the disintegrable polymer comprising one or more of the following: an epoxy polymer derived from an epoxy base and a curing agent having cleavable bonds; a cured cyanate ester; or a poly(hexahydrotriazine); or a precursor thereof, wherein the magnesium-based alloy comprises magnesium in a weight percent that is greater than the sum of the weight percent of all other components in the magnesium-based alloy.

23. A method to disintegrate an article of claim 1, the method comprising exposing the article to a fluid comprising one or more of the following: water; brine; an acid; a base; or an acidified ethylene glycol.

24. The method of claim 23, wherein the article is exposed to the fluid at a temperature of about 25° F. to about 500° F. and a pressure of about 100 psi to about 45,000 psi.

25. A method of using an article of claim 1, the method comprising:

forming the article, the article comprising a first portion that is degradable in a fluid at a first degradation rate and a second portion that is degradable in the fluid at a second degradation rate, wherein the first degradation rate is greater than the second degradation rate;

using the article to perform a first operation;

exposing the article to the fluid;

selectively degrading the first portion of the article to provide a degraded article; and using the degraded article to perform a second operation that is different from the first operation, wherein the first portion comprises a disintegrable metal and the second portion comprises disintegrable polymer or the first portion comprises a disintegrable polymer and the second portion comprises a disintegrable metal.

26. The method of claim 25, wherein the article is a downhole article, the fluid is a wellbore fluid, and the first and second operations are wellbore operations.

27. The article of claim 1, wherein the weight ratio of the disintegrable polymer relative to the disintegrable metal in the hybrid article is about 3:1 to about 1:1.5.

28. A hybrid article comprising:

a degradable metal comprising a metal composite which comprises: a cellular nanomatrix comprising a metallic nanomatrix material; and a metal matrix disposed in the cellular nanomatrix, the metal matrix comprising magnesium or a magnesium alloy and the metallic nanomatrix material comprising calcium, cobalt, copper, iron, molybdenum, nickel, zinc, an intermetallic compound thereof, or a combination thereof; and a disintegrable polymer comprising one or more of the following: an epoxy polymer derived from an epoxy base and a curing agent having cleavable bonds; a cured cyanate ester; or a poly(hexahydrotriazine), wherein the magnesium-based alloy comprises magnesium in a weight percent that is greater than the sum of the weight percent of all other components in the magnesium-based alloy.

29. The article of claim 28, wherein the metal matrix comprises the magnesium alloy; and the metallic nanomatrix material comprises cobalt, copper, iron, nickel, an intermetallic compound thereof, or a combination thereof.

30. A method of manufacturing the disintegrable hybrid article of claim 28, the method comprising:

combining a disintegrable metal shavings with a disintegrable polymer to provide a hybrid composition, the disintegrable metal shavings comprising a metal composite which comprises: a cellular nanomatrix comprising a metallic nanomatrix material; and a metal matrix disposed in the cellular nanomatrix, the metal matrix comprising magnesium or a magnesium alloy and the metallic nanomatrix material comprising calcium, cobalt, copper, iron, molybdenum, nickel, zinc, an intermetallic compound thereof, or a combination thereof, and the disintegrable polymer comprising one or more of the following: an epoxy polymer derived from an epoxy base and a curing agent having cleavable bonds; a cured cyanate ester; a poly(hexahydrotriazine); or a precursor thereof; and molding the hybrid composition to form the disintegrable hybrid article, wherein the magnesium-based alloy comprises magnesium in a weight percent that is greater than the sum of the weight percent of all other components in the magnesium-based alloy.

31. The article of claim 28, wherein the metal matrix is present in an amount from 50 wt % to 95 wt %, and the amount of the metal nanomatrix material is present in an amount of 10 wt % to 50 wt %, each based on the weight of the metal composite.

\* \* \* \* \*